United States Patent [19]

Oka et al.

[11] Patent Number: 5,288,559
[45] Date of Patent: Feb. 22, 1994

[54] COATING COMPOSITION FOR METAL SHEET FOR TWO-PIECE CAN AND METAL SHEET COATED WITH THE COMPOSITION

[75] Inventors: Masami Oka; Takao Aoki; Hiroshi Fujimoto; Hiroshi Tachika, all of Ootsu, Japan

[73] Assignee: Toyo Boseki Kabushiki Kaisha, Osaka, Japan

[21] Appl. No.: 961,871

[22] Filed: Oct. 15, 1992

[30] Foreign Application Priority Data

Oct. 22, 1991 [JP] Japan .................................. 3-304265

[51] Int. Cl.$^5$ ............................................. B32B 27/06
[52] U.S. Cl. ...................... 428/482; 528/272; 528/296; 528/298; 528/300; 528/301; 528/302; 528/305; 528/307; 528/308; 528/308.7; 525/437; 525/441; 525/443; 525/472; 525/509; 525/519; 428/458; 428/460
[58] Field of Search ............... 528/272, 296, 298, 300, 528/301, 302, 305, 307, 308, 308.7; 525/437, 441, 443, 472, 509, 519; 428/482, 458, 460

[56] References Cited

U.S. PATENT DOCUMENTS

| Re. 29,961 | 4/1979 | van Dorp et al. | 427/195 |
| 3,919,350 | 11/1975 | Iwasawa et al. | 525/443 |
| 4,714,657 | 12/1987 | Quinn et al. | 428/412 |

FOREIGN PATENT DOCUMENTS

| 0025478 | 3/1981 | European Pat. Off. . |
| 0234774 | 9/1987 | European Pat. Off. . |
| 0394589 | 10/1990 | European Pat. Off. . |
| 1805199 | 5/1970 | Fed. Rep. of Germany . |
| 1805187 | 7/1970 | Fed. Rep. of Germany . |
| 85060 | 6/1985 | France . |

*Primary Examiner*—John Kight, III
*Assistant Examiner*—Sam A. Acquah
*Attorney, Agent, or Firm*—Wegner, Cantor, Mueller & Player

[57] ABSTRACT

Provided is a coating composition for a two-piece can containing a polyester resin (A) consisting essentially of terephthalic acid and propylene glycol and containing tri- or more functional polycarboxylic acid or polyol comonomer(s) and an alkyl-etherified aminoformaldehyde resin (B); and the coating film (C) to be obtained by reacting these (A) and (B) in the composition has larger tensile strength and elongation than the film made of only (A). The coating composition is coated on at least one surface of a metal sheet to give a coated metal sheet for a two-piece can. The coated metal sheet may be formed into a drawn and ironed can or a drawn and re-drawn can. The adhesiveness of the coated film to the metal sheet is high, and the coated film has excellent resistance to blistering and resistance to whitening and has excellent flavor preservability.

5 Claims, No Drawings

COATING COMPOSITION FOR METAL SHEET FOR TWO-PIECE CAN AND METAL SHEET COATED WITH THE COMPOSITION

FIELD OF THE INVENTION

The present invention relates to a coating composition for a metal sheet and also to an organic film coated metal sheet which may be formed into a two-piece can such as a drawn and ironed can or drawn and re-drawn can.

BACKGROUND OF THE INVENTION

An organic coating film is coated on the inner surface of a metal can for the purpose of preventing corrosion of the metal material of the can and of not deteriorating the taste and flavor of the content in the can, and it is needed to be non-toxic, to be durable to heat sterilization, to involve dissolution of only a small mass of constitutive components and to have good adhesion and workability.

Beverage cans and food cans are grouped into so-called three-piece cans and two-piece cans from the methods of manufacturing them. Recently, two-piece cans are increasing due to increase of the demand for beer, juice, soda drinks, etc.

A two-piece can is called a side-seamless can, which is formed by drawing or ironing a metal material such as an aluminium sheet, tinplate or tin-free steel sheet to give a cup composed of a seamless body and a bottom as seamlessly integrated with the body. It is grouped into a drawn and ironed can (DI can), a drawn can (DR can) and a drawn and re-drawn can (DRD can) from the forming methods.

For coating a two-piece can with an organic coating film, in general, a method of spray coating a shaped can with a coating agent is much used. Recently, in addition, there are also known a method of previously laminating a synthetic resin film on a metal material and a method of using a metal sheet as precoated with a coating agent such as a vinyl organosol, epoxy-phenolic or acrylic material, before shaping it into a can.

However, since the former method needs a step of laminating a film such as polyethylene terephthalate on the metal base with an adhesive, the manufacture cost thereof is high. Therefore, the latter method is desired. However, since the vinyl organosol coating agent consists essentially of a vinyl chloride polymer, it involves problems of insanitation, necessity of recycling of used cans and environmental pollution. The other epoxy-phenolic coating agent and acrylic coating agent could not follow the elongation or deformation of the metal base in the shaping step of manufacturing cans so that the coated film would be cracked or peeled off from the base and, as a result, the corrosion resistance of the film as previously coated on the metal sheet base is noticeably decreased by the process of shaping it into a can.

In the process of manufacturing DI cans and DRD cans, the previously coated film is often scratched mechanically to cause peeling of the coated film and decreasing of the adhesion of the same to the metal base. The defects become noticeable in the heat sterilization step to be effected after charging of a product into the shaped can. As a result, the can could not be used as a food can or beverage.

A polyester resin has high adhesion to metal and has few problems of insanitation, and use of it as a coating agent to be applied to the inner surface of a metal can has heretofore been investigated. However, the current situation is such that a polyester resin coating agent which is durable to the above-mentioned severe shaping step and which has high resistance to blistering and high resistance to whitening in heat sterilization is unknown up to the present.

SUMMARY OF THE INVENTION

Accordingly, the object of the present invention is to provide an organic film coated metal sheet, the coated film of which has excellent adhesion, high resistance to blistering, high resistance to whitening and high flavor preservability and which metal sheet may be formed into any of DI can, DR can and DRD can, and also to provide a coating composition to be used for producing such an organic film coated metal sheet.

In order to attain the above-mentioned object, the present inventors earnestly studied and, as a result, have found that when a coating composition comprising a specific polyester resin consisting essentially of terephthalic acid as an acid component and propylene glycol as a glycol component, and an alkyl-etherified formaldehyde resin is applied to a metal sheet and hardened to form a specific cured film thereon, the intended object can be attained. On the basis of the finding, they have achieved the present invention.

Specifically, the present invention provides a coating composition to be coated on a metal sheet for forming a two-piece can such as a drawn and ironed can or a drawn and re-drawn can; the composition consisting essentially of from 70 to 99 parts of a polyester resin (A), which is composed of an acid component comprising from 60 to 100 mol % of terephthalic acid and from 0 to 40 mol% of other dicarboxylic acid(s) than terephthalic acid, a glycol component comprising from 40 to 100 mol % of propylene glycol and from 0 to 60 mol % of other aliphatic glycol(s) and/or alicyclic glycol(s) than propylene glycol, and from 0.1 to 3 mol %, to the total acid component or total glycol component, of tri- or more functional polycarboxylic acid(s) or polyol(s) and which has a reduced viscosity of 0.3 dl/g or more, and from 1 to 30 parts of an alkyl-etherified aminoformaldehyde resin (B), the organic coating film (C) to be obtained by reacting the above-mentioned (A) and (B) in the composition having the following characteristic (1):

(1) The tensile strength at break (kg/mm$^2$) and the tensile elongation at break (%) of the organic coating film (C) are larger than those of the film made of only (A).

In addition, the present invention also provides a coated metal sheet for forming a two-piece can, in which the above-mentioned organic coating film (C) has been coated on at least one surface of the metal sheet.

DETAILED DESCRIPTION OF THE INVENTION

Since the metal sheet of the present invention is coated with the above-mentioned specific organic cured film (C), not only the adhesion of the film to the metal base is excellent even after the sheet has been formed into a can but also the formed can has high resistance to blistering and high resistance to whitening during heat sterilization of it.

The polyester resin (A) for use in the present invention contains, as the dicarboxylic component, from 60 to 100 mol%, preferably from 65 to 100 mol %, more preferably from 75 to 100 mol %, of terephthalic acid and from 0 to 40 mol%, preferably from 0 to 35 mol %, more preferably from 0 to 25 mol %, of other dicarboxylic acid(s) than terephthalic acid.

The other dicarboxylic acids than terephthalic acid include, for example, aromatic dicarboxylic acids such as isophthalic acid, orthophthalic acid, 5-sodium-sulfoisophthalic acid and naphthalene-dicarboxylic acid; aliphatic dicarboxylic acids such as succinic acid, adipic acid, azelaic acid, sebacic acid, dodecane-dicarboxylic acid and dimer acids; and alicyclic dicarboxylic acids such as hexahydroterephthalic acid and hexahydrophthalic acid anhydride.

In the polyester resin (A) for use in the present invention, if the content of terephthalic acid in the acid component is less than 60 mol % and the content of other dicarboxylic acid(s) than terephthalic acid is more than 40 mol%, the resistance to whitening of the formed can be decreased. Where aliphatic dicarboxylic acids are used as the other dicarboxylic acids than terephthalic acid, the content of them is desired to be 30 mol % or less, more preferably 20 mol% or less.

The polyester resin (A) for use in the present invention contains, as the glycol component, from 40 to 100 mol%, preferably from 60 to 99 mol %, of propylene glycol, and from 0 to 40 mol %, preferably from 1 to 40 mol%, of other glycol(s) than propylene glycol.

The other glycols than propylene glycol include, for example, ethylene glycol, 1,3-propanediol, 1,4-butanediol, 1,3-butanediol, 1,5-pentanediol, 1,6-hexanediol, neopentyl glycol, diethylene glycol, dipropylene glycol, 1,4-cyclohexane-dimethanol, p-xylenediglycol, 2,2-dimethylol-butane, 3,3-dimethylolheptane, tricyclodecane-dimethanol, 1,9-nonanediol, and ethylene oxide or propylene oxide adduct to bisphenol A.

In the polyester resin (A) for use in the present invention, if the content of propylene glycol in the glycol component is less than 40 mol % and the content of other glycol(s) than propylene glycol is more than 60 mol%, the resistance to whitening of the formed can would be decreased so that the intended object of the present invention could not be attained.

The polyester resin (A) for use in the present invention contains tri- or more functional polycarboxylic acid(s) or polyol(s), in addition to the above-mentioned dicarboxylic acid component and glycol component, as further comonomers, in an amount of from 0.1 to 3.0 mol % to the total acid component or glycol component.

Tri- or more functional polycarboxylic acids include, for example, trimellitic acid anhydride and pyromellitic acid anhydride; and tri- or more functional polyols include, for example, glycerin, trimethylolethane, trimethylol-propane and pentaerythritol. If the tri- or more functional polycarboxylic acid or polyol component is less than 0.1 mol %, a polyester resin having a high reduced viscosity could hardly be obtained. If it is more than 3 mol%, the coated and hardened film from the resin would be brittle.

It is indispensable that the polyester resin (A) for use in the present invention has a reduced viscosity of 0.3 dl/g or more. If the reduced viscosity of the resin (A) is less than 0.3 dl/g the adhesion of the resin to metal would be decreased and the coated and hardened film from the resin would have poor tensile strength and elongation and therefore the resistance to whitening and the resistance to corrosion of the formed can would noticeably lower.

The polyester resin of the present invention is desired to have a solubility parameter (SP value) of 10.5 or more, a specific gravity of 1.25 or more and a glass transition temperature (Tg) of 30° C. or higher, preferably 40° C. or higher. This is because, the resin of satisfying the conditions is more effectively applied to a metal sheet to attain the object of the present invention.

The alkyl-etherified aminoformaldehyde resin (B) for use in the present invention is a condensation product to be obtained from a formaldehyde or paraformaldehyde as alkyl-etherified with an alcohol having from 1 to 4 carbon atoms, such as methanol, ethanol, n-propanol, iso-propanol or n-butanol, and urea, N,N'-ethyleneurea, dicyanediamide or aminotriazine. Concretely, it includes, for example, methoxylated methylolurea, methoxylated methylol-N,N'-ethyleneurea, methoxylated methyloldicyanediamide, methoxylated methylolmelamine, methoxylated methylolbenzoguanamine, butoxylated methylolmelamine, and butoxylated methylolbenzoguanamine. Of them, especially preferred are benzoguanamine compounds.

The proportion of the above-mentioned polyester resin (A) to the above-mentioned alkyl-etherified aminoformaldehyde resin (B) in the coating composition of the present invention is from 99/1 to 70/30 (polyester resin (A)/alkyl-etherified aminoformaldehyde resin (B), by weight), preferably from 99/1 to 75/25 (by weight), more preferably from 99/1 to 90/10 (by weight). This is to give a film, after reaction of (A) and (B), having larger tensile strength and elongation than the film to be formed from only (A). If the proportion of the alkyl-etherified aminoformaldehyde resin is more than the defined range, the coated and hardened film would be brittle so that not only drawing and ironing or drawing and re-drawing for forming a can from the coated metal sheet would be difficult but also the flavor preservability of the formed can would worsen and the corrosion resistance of the same would also lower. If the coating composition of the present invention contains no alkyl-etherified aminoformaldehyde resin (B) or contains an insufficient amount of the resin (B), the tensile strength and elongation of the coated film would lower. The coated and hardened film from the composition is preferably desired to have a tensile strength at break of 5 kg/mm$^2$ or more and a tensile elongation at break of 5% or more.

By incorporation of the alkyl-etherified aminoformaldehyde resin into the coating composition of the present invention, the flavor preservability of the coated film is effectively improved, for example, in such a way that the absorption amount of D-limonene by the film is decreased. For instance, even in the severe D-limonene absorption test which will be mentioned below, the absorption amount of D-limonene by the coated film is 10 mg/g or less. Thus, the coated film may have extremely excellent flavor preservability.

In carrying out the present invention, the above-mentioned polyester resin (A) and alkyl-etherified aminoformaldehyde resin (B) are generally dissolved in an organic solvent to give a liquid coating composition, which is coated on a metal sheet and dried or hardened thereon. As the organic solvent, any and every known one is usable. For instance, it includes toluene, xylene, ethyl acetate, butyl acetate, methyl ethyl ketone, cyclohexanone, isophorone, Solvesso #100 and Solvesso

150. These may suitably be selected in consideration of the solubility and vaporization speed thereof.

The metal sheet to be used in the present invention may be a surface-treated steel sheet such as an aluminium-plated, zinc-plated, tin-plated, nickel-plated or chromate-treated one, or may also be an aluminium sheet or aluminium alloy sheet. The thickness of the sheet may be from 0.1 to 0.5 mm.

Coating of the coating composition of the present invention over the metal sheet may be effected by any known method, for example, by coating the composition on at least one surface of the sheet by roll coating, spray coating or dip coating, followed by drying or hardening the coated layer generally at 60° to 250° C. for a period of from 0.1 second to 60 minutes.

The thickness of the dried or hardened film is not specifically defined but is desired to be generally from 3 to 50 μm, preferably from 5 to 30 μm.

Where the coated film is formed on the both surfaces of the metal sheet, the same coating composition or different coating compositions may be coated on them (inner and outer surfaces of can). The coating composition of the present invention may contain known colorants or pigments for the purpose of hinding the metal sheet or of controlling the mechanical strength of the coated film. For instance, usable for the purpose are inorganic pigments such as titanium dioxide, zinc flower, barium sulfate, calcium carbonate, talc, silica powder, aerosil, alumina and carbon black, as well as organic pigments such as Phthalocyanine Green and Toluidine Red. The content of such pigments in the coating composition may be from 0.1 to 200% by weight, preferably from 0.5 to 150% by weight, to the polyester resin therein.

The coating composition of the present invention may contain a leveling agent for improving the smoothness of the coated film, a defoaming agent or surfactant for preventing pin holes or cratering of the coated film, a slipping agent for improving the surface slip of the coated film, and also a hardening catalyst and a thixotropic agent.

In the step of obtaining the organic film coated metal sheet of the present invention, a primer layer of, for example, an urethane, polyester, polyamide or epoxy primer may be provided on the surface of the metal sheet for the purpose of improving the adhesiveness of the coated layer to the metal base.

Using the organic film coated metal sheet of the present invention, a drawn and ironed can or a drawn and re-drawn can may be formed by a process comprising a step of stamping the sheet into a disc having a size to be determined in consideration of the drawing ratio and the ironing ratio, then a step of shaping the disc into a drawn cup by drawing, then a step of re-drawing and-/or ironing the cup.

The shaped can is thereafter worked for trimming, necking, flanging and/or printing to be formed into a two-piece can.

The drawing ratio and the ironing ratio may well be determined in consideration of the kind of the metal material to be used and the shape of the can to be formed. Heating at a suitable temperature may optionally be effected during the above-mentioned working procedure for the purpose of promoting the shapability of the coated organic film.

The drawn and ironed can or the drawn and re-drawn can of the present invention is formed from an organic film coated metal sheet, which is coated with a film of a reaction product from the specific polyester resin (A) to be prepared by copolymerization of the essential components comprising terephthalic acid and propylene glycol along with tri- or more functional polycarboxylic acid(s) or polyol(s) and the alkyl-etherified formaldehyde resin (B). Therefore, the adhesiveness of the coated film to the metal base and the corrosion resistance of the coated can are excellent. In addition, the coated can has sufficient resistance to heat sterilization. Therefore, the present invention has such a merit that it is free from the complicated operation of coating a shaped can. Thus, the present invention may apply to formation of various drink cans and food cans.

The present invention will be explained in more detail by way of the following examples, which, however, are not intended to restrict the scope of the present invention. In the examples, "parts" are by weight unless otherwise specifically indicated.

Preparation of Coating Compositions 300 parts of the polyester resin as indicated in Tables 1 and 2 below was dissolved in 700 parts of cyclohexanone; and an alkyl-etherified aminoformaldehyde resin, p-dodecylbenzenesulfonic acid as a hardening catalyst, and a leveling agent were added thereto each in a determined amount to prepare various coating compositions to be used in the present invention. The compositions of the coating compositions thus prepared are shown in Tables 3 and 4 below.

Preparation of White Coating Compositions 300 parts of the polyester resin as indicated in Tables 1 and 2 was dissolved in 450 parts of cyclohexanone and 450 parts of Solvesso #150; an alkyl-etherified aminoformaldehyde resin, p-dodecylbenzenesulfonic acid as a hardening agent, and titanium white as a white pigment were added thereto; and these were dispersed in a paint shaker with glass beads for 6 hours to prepare various white coating agents Nos. 14 to 25 to be used in the present invention. The compositions of the white coating compositions thus prepared are shown in Tables 7 and 8 below.

Evaluation of Coated Film of Shaped Can (1) Outward appearance

The coated film on the inner surface of the shaped can was checked by visual observation.

(2) Adhesiveness

A test piece was cut out from the shaped can, and the adhesiveness of the coated film to the metal base was checked by a cross-cut adhesion test (JIS D0202).

(3) Resistance to whitening and resistance to blistering

The coated can was treated in a steam of 130° C. for 30 minutes, whereupon the outward appearance of the thus treated can was checked by visual observation.

◯: Excellent
□: Good
Δ: Not good
x: Bad (4) Resistance to corrosion

A soda drink was put into the shaped can by seambottling and stored under the condition of 30° C. for one year, whereupon the condition of the stored can as to whether or not the inner surface was corroded or the charged content leaked out was checked.

◯: Good
Δ: Somewhat corroded x: Corroded and leaked (5) Resistance to acid (resistance to blistering)

1% lactic acid aqueous solution was put in the shaped can, which was then subjected to retort treatment at 130° C. for 30 minutes, whereupon the outward appearance of the coated film was checked by visual observation.

○: Excellent
□: Good
Δ: Not good
x: Bad (6) Flavor preservability

A coating composition was coated on a tinplate in a dry thickness of 50 μm and dried and hardened at 230° C. for 60 seconds. Then, the coated film was peeled off with mercury to form a filmy test piece (50 mm × 40 mm). The film thus formed was dipped in 95% D-limonene aqueous solution at 37° C. for 10 days, whereupon the absorption amount of D-limonene (mg/g) was measured.

(7) Tensile elongation at break

A filmy test piece (15 mm × 30 mm) was formed in the same manner as in (6), and this was tested with an Instron type tensile testing machine under the condition of a crosshead speed of 5 cm/min.

EXAMPLE 1

Coating composition No. 1 shown in Table 3 was coated on one surface (inner surface) of a tin free steel sheet having a thickness of 0.2 mm in a dry thickness of 20 μm by roll coating and dried and hardened at 230° C. for 60 seconds to obtain an organic film coated metal sheet of the present invention. Palm oil was coated over the coated metal sheet, which was then stamped to a disc. This was drawn and re-drawn by an ordinary drawing and re-drawing method to form a re-drawn can having a cup diameter of 63 mm and a cup height of 100 mm of the present invention. The properties of the can thus obtained were evaluated and the results are shown in Table 5 below.

EXAMPLES 2 TO 9

In the same manner as in Example 1, coating compositions Nos. 2 to 9 shown in Table 3 were used and re-drawn cans of the present invention were obtained.

The properties of the cans thus obtained were evaluated and the results are shown in Table 5 below.

EXAMPLES 10 TO 17

In the same manner as in Example 1, white coating compositions Nos. 14 to 21 shown in Table 7 below were used and re-drawn cans of the present invention were obtained.

The properties of the cans thus obtained were evaluated and the results are shown in Table 9 below.

COMPARATIVE EXAMPLES 1 TO 4

In the same manner as in Example 1, coating compositions Nos. 10 to 13 shown in Table 4 were used and re-drawn cans were obtained.

The properties of the cans thus obtained were evaluated and the results are shown in Table 6.

COMPARATIVE EXAMPLES 5 TO 8

In the same manner as in Example 1, white coating compositions Nos. 22 to 25 shown in Table 8 were used and re-drawn cans were obtained.

The properties of the cans thus obtained were evaluated and the results are shown in Table 10.

The organic film coated metal sheet of the present invention is one as coated with an organic film of a specific polyester resin to be obtained by copolymerizing essential components of terephthalic acid and propylene glycol along with tri- or more functional polycarboxylic acid(s) or polyol(s), followed by hardening the resin along with an alkyl-etherified aminoformaldehyde resin. The film has higher tensile strength and elongation that the film to be formed from only the polyester resin and has excellent adhesion to metal. Therefore, the coated film has excellent adhesion to the metal base and has excellent resistance to corrosion. In addition, it has sufficient resistance to heat treatment. The present invention is free from the troublesome step of coating a shaped can. Since the coating composition contains a polyester resin, it is free from the problem of insanitation.

TABLE 1

| Composition 1) and property of polyester resin physical property of coated film | Resin | | | | |
| --- | --- | --- | --- | --- | --- |
| | A | B | C | D | E |
| Terephthalic Acid | 75 | 100 | 89 | 95 | 75 |
| Isophthalic Acid | 25 | | | 4 | 24 |
| Sebacic Acid | | | 10 | | |
| Trimellitic Acid | | | 1 | 1 | 1 |
| Ethylene Glycol | 27 | 27 | 35 | | |
| Propylene Glycol | 72.4 | 72.4 | 65 | 80 | 81 |
| 1,4-Butanediol | | | | | 19 |
| Neopentyl Glycol | | | | 20 | |
| Trimethylol-propane | 0.6 | 0.6 | | | |
| Glass Transition Temperature (°C.) 2) | 79 | 80 | 48 | 68 | 60 |
| Reduced Viscosity (dl/g) 3) | 0.60 | 0.56 | 0.55 | 0.63 | 0.53 |
| Specific Gravity | 1.282 | 1.283 | 1.276 | 1.256 | 1.263 |
| SP Value | 11.00 | 11.01 | 10.94 | 10.62 | 10.89 |
| Tensile Strength at Break (kg/mm²) | 2.9 | 3.7 | 3.0 | 3.5 | 4.0 |
| Tensile Elongation at Break (%) | 3.0 | 3.9 | 4.1 | 3.8 | 4.1 |

Notes:
1) The composition was analyzed by NMR analysis and gas chromatography by alcoholysis.
2) The glass transition point was obtained by DSC analysis.
3) The reduced viscosity was measured in a mixed solvent of phenol/tetrachloroethane (6/4, by weight) at 30° C., the concentration of the sample in the solvent being 0.1 g/25 ml.

TABLE 2

| Composition 1) and property of polyester resin physical property of coated film | Resin | | | |
| --- | --- | --- | --- | --- |
| | F | G | H | I |
| Terephthalic Acid | 65 | 50 | 50 | 75 |
| Isophthalic Acid | 34 | 50 | 30 | 25 |
| Sebacic Acid | | | 20 | |
| Trimellitic Acid | 1 | | | |

TABLE 2-continued

| Composition 1) and property of polyester resin physical property of coated film | Resin | | | |
|---|---|---|---|---|
| | F | G | H | I |
| Ethylene Glycol | 30 | 50 | 50 | 27 |
| Propylene Glycol | 70 | 50 | | 73 |
| 1,4-Butanediol | | | | |
| Neopentyl Glycol | | | 50 | |
| Trimethylol-propane | | | | |
| Glass Transition Temperature (°C.) 2) | 74 | 70 | 8 | 75 |
| Reduced Viscosity (dl/g) 3) | 0.51 | 0.55 | 0.69 | 0.28 |
| Specific Gravity | 1.280 | 1.284 | 1.238 | 1.282 |
| SP Value | 11.00 | 11.01 | 10.49 | 11.02 |
| Tensile Strength at Break (kg/mm$^2$) | 3.9 | 4.0 | 1.5 | 3.2 |
| Tensile Elongation at Break (%) | 4.0 | 3.6 | 2.5 | 3.0 |

Notes:
1) The composition was analyzed by NMR analysis and gas chromatography by alcoholysis.
2) The glass transition point was obtained by DSC analysis.
3) The reduced viscosity was measured in a mixed solvent of phenol/tetrachloroethane (6/4, by weight) at 30° C., the concentration of the sample in the solvent being 0.1 g/25 ml.

TABLE 3

| Components (parts) | Sample No. | | | | | | | | |
|---|---|---|---|---|---|---|---|---|---|
| | 1 | 2 | 3 | 4 | 5 | 6 | 7 | 8 | 9 |
| Polyester Resin | A | A | B | B | B | C | D | E | F |
| Amount of Polyester Resin | 95 | 85 | 97 | 80 | 90 | 90 | 90 | 90 | 90 |
| Methylated Methylol-melamine | — | 10 | — | — | — | — | — | — | — |
| Butylated Methylol-melamine | — | — | — | — | — | — | 5 | — | — |
| Methylated Butylated Methylol-melamine | — | — | — | 10 | 5 | — | — | — | 10 |
| Methylated Methylol-benzoguanamine | 5 | 5 | 3 | 10 | 5 | 10 | 5 | 10 | 10 |
| Hardening Catalyst p-dodecylbenzenesulfonic Acid | 0.1 | 0.15 | 0.1 | 0.2 | 0.2 | 0.1 | 0.1 | 0.1 | 0.25 |
| Leveling Agent Polyflow S | 1 | 1 | 1 | 1 | 1 | 1 | 1 | 1 | 1 |

TABLE 4

| Components (parts) | Sample No. | | | |
|---|---|---|---|---|
| | 10 | 11 | 12 | 13 |
| Polyester Resin | G | H | I | A |
| Amount of Polyester Resin | 80 | 80 | 80 | 100 |
| Methylated Methylol-melamine | 10 | — | 10 | — |
| Butylated Methylol-melamine | 10 | — | 10 | — |
| Methylated Butylated Methylol-melamine | — | 10 | — | — |
| Methylated Methylol-benzoguanamine | — | 10 | — | — |
| Hardening Catalyst p-dodecylbenzenesulfonic Acid | 0.25 | 0.25 | 0.25 | 0 |
| Leveling Agent Polyflow S | 1 | 1 | 1 | 1 |

TABLE 5

| | Example | | | | | | | | |
|---|---|---|---|---|---|---|---|---|---|
| | 1 | 2 | 3 | 4 | 5 | 6 | 7 | 8 | 9 |
| Coating Composition (Sample No.) | No. 1 | No. 2 | No. 3 | No. 4 | No. 5 | No. 6 | No. 7 | No. 8 | No. 9 |
| Adhesiveness | 100/100 | 100/100 | 100/100 | 100/100 | 100/100 | 100/100 | 100/100 | 100/100 | 100/100 |
| Resistance to Whitening | ○ | □ | ○ | □ | ○ | ○ | ○ | ○ | □ |
| Resistance to Blistering | ○ | ○ | □ | ○ | ○ | ○ | ○ | ○ | □ |
| Resistance to Corrosion | ○ | ○ | ○ | ○ | ○ | ○ | ○ | ○ | ○ |
| Flavor Preservability (Absorption Amount of D-limonene, mg/g) | 6.8 | 6.9 | 5.9 | 5.8 | 6.8 | 5.7 | 4.3 | 7.1 | 6.3 |
| Physical Property of Coated Film | | | | | | | | | |
| Tensile Strength at Break (kg/mm$^2$) | 5.6 | 6.8 | 5.1 | 5.9 | 8.4 | 6.4 | 8.0 | 6.0 | 6.5 |
| Tensile Elongation at Break (%) | 6.3 | 5.9 | 5.0 | 5.0 | 24.2 | 30.0 | 15.0 | 20.0 | 5.9 |

TABLE 6

| | Comparative Example | | | |
|---|---|---|---|---|
| | 1 | 2 | 3 | 4 |
| Coating Composition (Sample No.) | No. 10 | No. 11 | No. 12 | No. 13 |
| Adhesiveness | 90/100 | 100/100 | cracked | cracked |
| Resistance to Whitening | X | X | X | X |
| Resistance to Blistering | X | X | X | X |
| Resistance to Corrosion | Δ | X | X | X |
| Flavor Preservability (Absorption Amount of D-limonene, mg/g) | 9.2 | 26.7 | 7.8 | 19.3 |
| Physical Property of Coated Film | | | | |
| Tensile Strength at Break (kg/mm$^2$) | 4.2 | 2.3 | 4.0 | 2.9 |
| Tensile Elongation at Break (%) | 4.4 | 140 | 4.3 | 3.0 |

TABLE 7

| Components (parts) | Sample No. | | | | | | | |
|---|---|---|---|---|---|---|---|---|
| | 14 | 15 | 16 | 17 | 18 | 19 | 20 | 21 |
| Polyester Resin | A | A | B | B | C | D | E | F |
| Amount of Polyester Resin | 100 | 100 | 100 | 100 | 100 | 100 | 100 | 100 |
| Methylated Methylol-melamine | 25 | — | 25 | 12.5 | 25 | 25 | 25 | 25 |
| Butylated Methylol-melamine | — | 25 | — | 12.5 | — | — | — | — |
| Hardening Catalyst p-dodecylbenzenesulfonic Acid | 0.25 | 0.10 | 0.15 | 0.25 | 0.20 | 0.25 | 0.10 | 0.20 |
| Titanium Dioxide | 150 | 150 | 150 | 150 | 150 | 150 | 150 | 150 |

TABLE 8

| Components (parts) | Sample No. | | | |
|---|---|---|---|---|
| | 22 | 23 | 24 | 25 |
| Polyester Resin | G | H | I | A |
| Amount of Polyester Resin | 100 | 100 | 100 | 100 |
| Methylated Methylol-melamine | 25 | — | 25 | — |
| Butylated Methylol-melamine | — | 25 | — | — |
| Hardening Catalyst p-dodecylbenzenesulfonic Acid | 0.20 | 0.25 | 0.10 | 0 |
| Titanium Dioxide | 150 | 150 | 150 | 150 |

TABLE 9

| | Example | | | | | | | |
|---|---|---|---|---|---|---|---|---|
| | 10 | 11 | 12 | 13 | 14 | 15 | 16 | 17 |
| White Coating Composition (Sample No.) | No. 14 | No. 15 | No. 16 | No. 17 | No. 18 | No. 19 | No. 20 | No. 21 |
| Adhesiveness | 100/100 | 100/100 | 100/100 | 100/100 | 100/100 | 100/100 | 100/100 | 100/100 |
| Resistance to Blistering | ○ | □ | ○ | ○ | □ | □ | □ | ○ |
| Resistance to Corrosion | ○ | ○ | ○ | ○ | ○ | ○ | ○ | ○ |
| Resistance to Acid | ○ | ○ | ○ | ○ | ○ | ○ | ○ | ○ |

TABLE 10

| | Comparative Example | | | |
|---|---|---|---|---|
| | 5 | 6 | 7 | 8 |
| White Coating Composition (Sample No.) | No. 22 | No. 23 | No. 24 | No. 25 |
| Adhesiveness | 99/100 | 100/100 | 90/100 | cracked |
| Resistance to Blistering | Δ | X | X | X |
| Resistance to Corrosion | Δ | Δ | X | X |
| Resistance to Acid | X | X | X | X |

We claim:

1. A coating composition to be coated on a metal sheet for forming a two-piece can; the composition being a solution consisting essentially of:
   (A) from 70 to 99 parts of a polyester resin (A), which is composed of:
      (1) an acid component comprising from 60 to 100 mol % of terephthalic acid and from 0 to 40 mol % of other dicarboxylic acid(s) than terephthalic acid,
      (2) a glycol component comprising from 40 to 100 mol% of propylene glycol and from 0 to 60 mol % of other aliphatic or alicyclic glycol(s) than propylene glycol, and
      (3) from 0.1 to 3 mol%, to the total acid component or total glycol component, or tri- or more functional polycarboxylic acid(s) or polyol(s) and which has a reduced viscosity of 0.3 or more, said polyester resin (A) having:
         (1) a glass transition temperature of 40° C. or higher,
         (2) a specific gravity of 1.25 or more, and
         (3) a dissolution parameter of 10.5 or more; and
   (B) from 1 to 30 parts of an alkyl-etherified aminoformaldehyde resin (B); dissolved in an organic solvent;
   (C) the organic coating film (C) to be obtained by reacting the polyester resin (A) and alkyl-etherified aminoformaldehyde resin (B) in the composition having the following characteristics:
      (1) the tensile strength at break ($kg/mm^2$) and the tensile elongation at break (%) of the organic coating film (C) are larger than those of a film made of only (A), and
      (2) the organic strength at break of coating film (C) has a tensile strength at break of 5 $kg/mm^2$ or more and a tensile elongation at break of 5% or more.

2. A coated metal sheet for forming a two-piece can, in which the organic coating film (C) of claim 1 has been coated on at least one surface of a metal sheet.

3. The coating composition as claimed in claim 1, in which the acid component of the polyester resin (A) contains from 75 to 100 mol % of terephthalic acid.

4. The coating composition as claimed in claim 1, in which the glycol component of the polyester resin (A) contains from 60 to 100 mol % of propylene glycol.

5. The coating composition as claimed in claim 1, in which the organic coating film (C) has an absorption amount of D-limonene of being 10 mg/g or less.

* * * * *